(12) United States Patent
Edren et al.

(10) Patent No.: US 12,344,061 B1
(45) Date of Patent: Jul. 1, 2025

(54) ACTIVE SUSPENSION COMPONENT DEGRADATION DETERMINATION

(71) Applicant: Zoox, Inc., Foster City, CA (US)

(72) Inventors: Johannes Edren, Belmont, CA (US); James W. Fash, Ann Arbor, MI (US); Ahditya Melkote, Foster City, CA (US); Sharath Kumar Thirupathyswamy, Livermore, CA (US)

(73) Assignee: Zoox, Inc., Foster City, CA (US)

( * ) Notice: Subject to any disclaimer, the term of this patent is extended or adjusted under 35 U.S.C. 154(b) by 156 days.

(21) Appl. No.: 18/362,397

(22) Filed: Jul. 31, 2023

(51) Int. Cl.
  *B60G 17/015* (2006.01)
  *B60G 17/04* (2006.01)

(52) U.S. Cl.
  CPC ..... *B60G 17/0152* (2013.01); *B60G 17/0424* (2013.01); *B60G 2202/154* (2013.01); *B60G 2204/80* (2013.01); *B60G 2400/5122* (2013.01); *B60G 2500/2062* (2013.01); *B60G 2600/1875* (2013.01)

(58) Field of Classification Search
  CPC ............ B60G 17/0152; B60G 17/0424; B60G 2202/154; B60G 2204/80; B60G 2400/5122; B60G 2500/2062; B60G 2600/1875
  See application file for complete search history.

(56) References Cited

U.S. PATENT DOCUMENTS

| 5,324,065 | A  | * | 6/1994 | Derrien | F16J 1/10 |
| | | | | | 180/9.54 |
| 11,815,081 | B2 | * | 11/2023 | Adams | F04B 39/0011 |
| 2021/0101434 | A1 | * | 4/2021 | Sawarynski, Jr. | B60G 17/0152 |

* cited by examiner

*Primary Examiner* — Xiao En Mo
(74) *Attorney, Agent, or Firm* — EIP US LLP

(57) ABSTRACT

This disclosure describes techniques for determining a state of a pressurized chamber of a suspension of a vehicle, wherein the pressurized chamber comprises a hydraulic fluid chamber and a gas chamber separated by a piston. The state is determined by varying a pressure in the hydraulic fluid chamber and determining a knee point in a change of pressure in the hydraulic fluid chamber. The knee point indicates that the separator has been bottomed out. The pressure in the knee point may be used to determine a state of the suspension system.

20 Claims, 6 Drawing Sheets

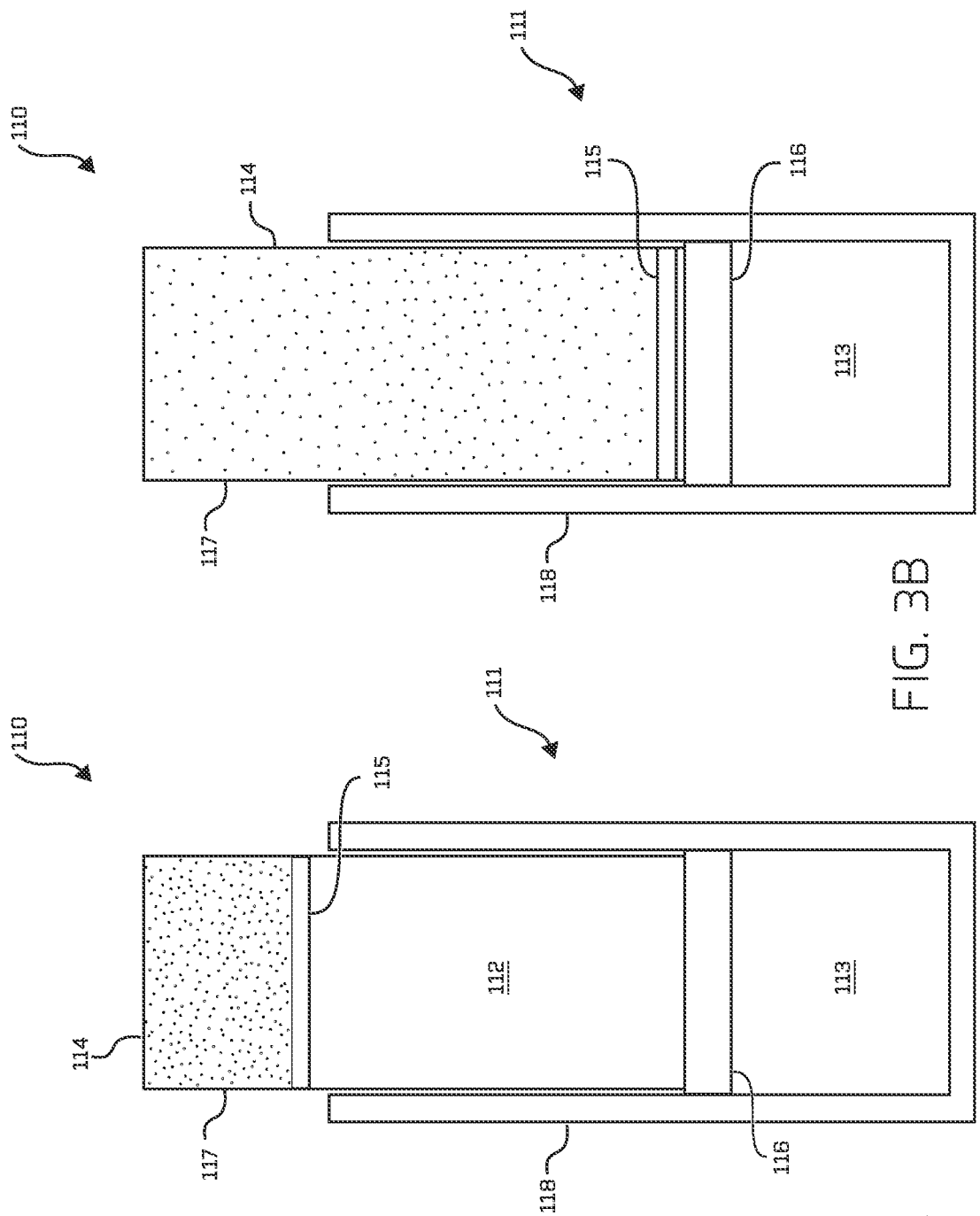

ACTIVE SUSPENSION COMPONENT DEGRADATION DETERMINATION

BACKGROUND

A vehicle may include a suspension system to enhance the comfort of passengers and improve the performance of the vehicle as it travels across uneven surfaces. The suspension system typically comprises a spring and a damper assembly that couples the wheels to the chassis of the vehicle. The spring may use a compressible gas to absorb the impact from vibrations and road irregularities, whereas the damper may use a hydraulic fluid to dampen oscillations of the spring and transfer forces within the suspension system. The spring's capability to absorb kinetic energy from the wheel can be determined, among other things, by the amount of gas available in the spring. As the gas has been observed to leak out over time, is may be necessary to refill the gas to ensure the proper operation of the spring.

BRIEF DESCRIPTION OF DRAWINGS

The detailed description is described with reference to the accompanying figures. The use of the same reference numbers in different figures indicates similar or identical components or features.

FIG. 3A schematically illustrates a spring when arranged in a predominantly compressible operating regime.

FIG. 3B schematically illustrates the spring when arranged in a predominantly incompressible operating regime.

DETAILED DESCRIPTION

Figure 1:
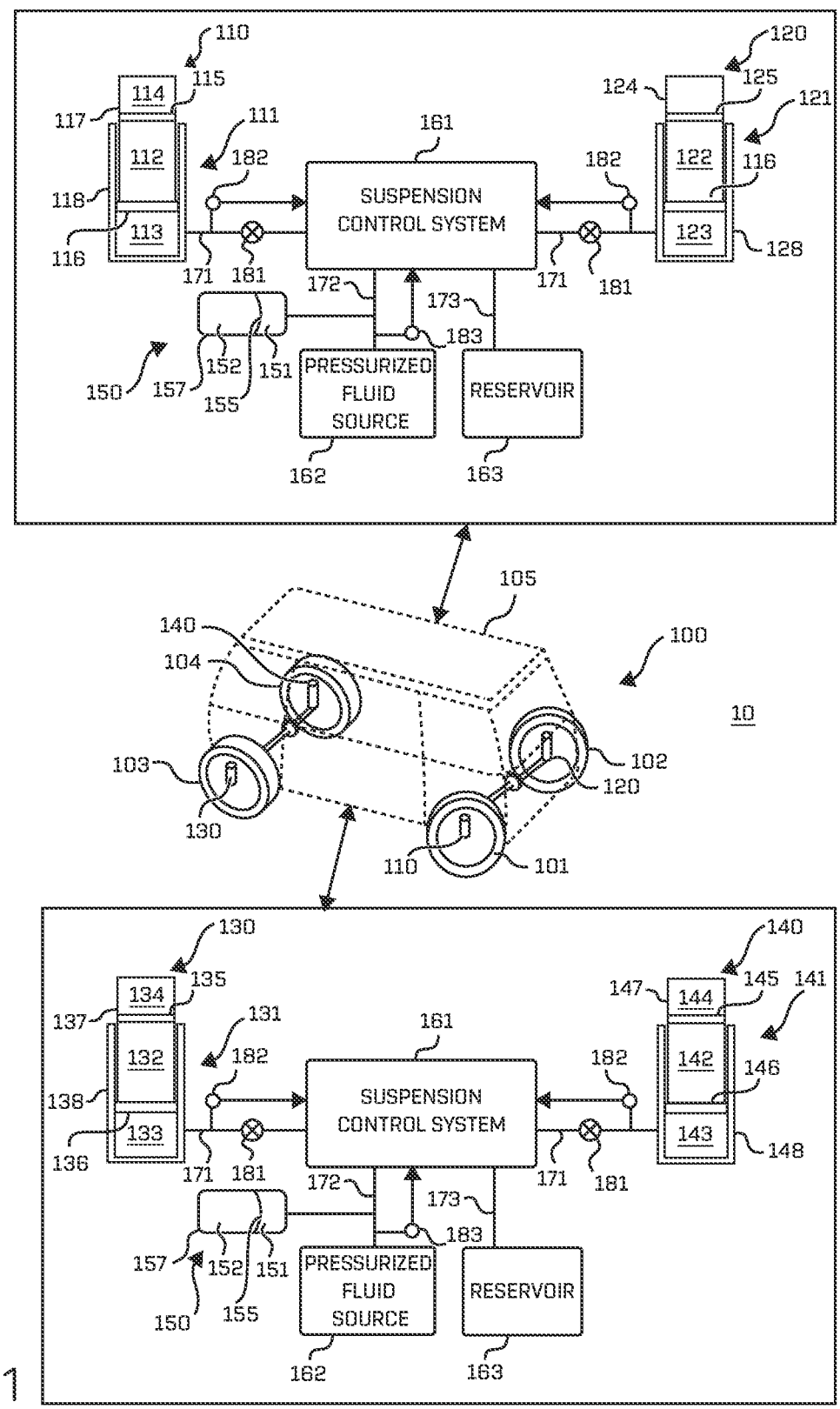
FIG. 1 schematically illustrates a suspension system comprising a plurality of springs coupling a chassis of a vehicle to a respective wheel of the vehicle.

This disclosure describes procedures, as well as methods, systems, and computer-readable media for determining an amount of gas in a gas chamber of a suspension system of a vehicle. The suspension system typically comprises a spring and a damper assembly that couples a wheel to the chassis of the vehicle. The spring may be configured to absorb the impact from vibrations and road irregularities, whereas the damper may be configured to dampen the oscillations of the spring. The spring may use a combination of a hydraulic fluid and a pressurized gas to absorb the impacts, in which the gas and the hydraulic fluid are separated by a movable separator that defines a gas chamber for the gas and hydraulic fluid chamber for the hydraulic fluid. During compression of the spring, for example in response to the wheel encountering a bump or a pothole, the hydraulic fluid pushes against the separator to compress the gas in the gas chamber, thereby storing the impact energy as potential energy in the gas chamber. During rebound, the pressurized gas is allowed to expand and causes the spring to extend.

The behavior of the spring may hence be determined at least in part by the amount of the gas in the gas chamber. Too little gas in the gas chamber may degrade the performance of the spring and cause the spring to bottom out when the wheel encounters road irregularities. As the gas has been observed to gradually leak out from the gas chamber, it is therefore of interest to monitor the amount of gas present in the gas chamber and determine that the amount of gas meets or exceeds a predetermined threshold amount to ensure proper operation of the spring.

The amount of gas in the gas chamber can be determined by gradually reducing the pressure in the hydraulic fluid chamber at least until the movable separator is bottomed out, i.e., until it reaches an end position corresponding to a maximum volume of the gas chamber and a minimum volume of the hydraulic fluid chamber. The end point of the separator may be detected as a knee point in a curve describing the pressure in the hydraulic fluid chamber as a function of time. The knee point indicates a change from a predominantly compressible operating regime of the spring, in which the separator moves to expand the gas chamber, to a predominantly incompressible operating regime in which the separator has been bottomed out and the maximum volume of the gas chamber has been reached. Assuming that the maximum volume of the gas chamber is known and that the pressure in the knee point is indicative of the pressure in the gas chamber, these data can be used to estimate the amount of gas present in the gas chamber, for example by using the ideal gas law which stipulates that the product of the pressure and the volume of a gas is proportional to the product of the amount of substance in moles and the temperature. The estimated amount of gas can then be compared with a predetermined value and a state of the spring determined accordingly.

As used in this disclosure, the spring is a component of the suspension system of a vehicle which may be used to absorb the energy from road impacts. The spring is typically combined with a damper for damping shock impulses and reducing the bouncing caused by the spring. The damper, which also may be referred to as a shock absorber, may operate by forcing hydraulic fluid through an internal passage within the damper, typically a damping piston, creating a flow resistance that absorbs kinetic energy from the hydraulic fluid and converts the energy into thermal energy. The combined operation of gas and hydraulic fluid may be referred to as hydropneumatics operation.

The spring and the damper may be separate elements or combined into a single unit. A strut is an example of a combined unit, in which a spring cylinder may be telescopically arranged within a damper cylinder. Generally, such a combined unit works by using the hydraulic fluid both for transferring forces from the wheel to the compressible gas in the gas chamber and for damping oscillations of the spring.

As used in this disclosure, the term 'hydraulic fluid' generally refers to a liquid through which power can be transmitted in the vehicle suspension system. Typically, the liquid is substantially non-compressible to allow efficient transmission of power at relatively high pressures. Examples of hydraulic fluids include mineral oil-based fluids and synthetic fluids.

The gas chamber may be filled with a gas that is relatively inert, thermally stable, and has a relatively low moisture content to help reducing corrosion inside the spring. Nitrogen is an example of such a gas, with which the gas chamber can be pre-pressurized to provide the desired behavior of the spring. The gas chamber may comprise a refill valve for supply of additional gas in case the amount of gas present in the chamber is determined to be below the threshold amount. The gas chamber may be refilled by a service technician at a service station, or by gas stored in a gas reservoir of the vehicle.

The term 'amount of gas' generally refers to a measure indicating the number of particles in the gas chamber (such as the number of nitrogen molecules). The particles or entities may hence be molecules or atoms, depending on the type of gas used. In some examples, the amount of gas may be indicated by the amount of substance, i.e., the number of particles divided by the Avogadro constant. The amount of gas is one of the variables in the ideal gas law, which may be used in the present disclosure to calculate the amount of gas present in the gas chamber. It will however be appreciated that the ideal gas law is merely one example of how to estimate the amount of gas in the chamber. Other models may be used as well, such as the van der Waals equation and the Berthelot Equation which account for the finite size of the gas particles and the forces between them. Further, it will also be appreciated that in some instances, the amount of gas is not actively determined. Instead, a reference amount of gas, such as the amount initially supplied to the gas chamber, may be used (together with the volume of the gas chamber and the temperature) to calculate a pressure corresponding to the reference amount of gas. The calculated pressure may then be compared with the measured pressure in the knee point. A deviation between calculated pressure and measured pressure in the knee point may indicate a difference in the reference amount of gas and the actual amount of gas, for example caused by a leakage. By comparing the difference with a threshold value, a state of the spring may be determined.

The 'knee point' generally refers to the point where there is a clear and significant change in the trend or behavior of the sensor data indicating the pressure in the first hydraulic fluid chamber. The knee point is indicative of a change in the operation of the suspension system, and more specifically a change between a predominantly compressible or elastic behavior (caused by the separator moving with the varying pressure in the hydraulic fluid chamber) and a predominantly incompressible behavior (caused by the separator being bottomed out).

As used in the present disclosure, the term 'state' of the suspension system (such as the spring or an accumulator) generally refers to the condition or performance level of the suspension system. More specifically, the state may refer to the spring's capability to absorb kinetic energy from the wheel, which may be determined by the amount of gas in the gas chamber. In an operational or normal state, the gas chamber may comprise enough gas to allow the spring to function as designed. This state may be determined by verifying that the amount of gas meets or exceeds a threshold amount. In a degraded or malfunction state, the performance of the spring may have dropped from its normal level. The spring may still be functional, but its capability of absorbing the energy from, e.g., road impacts may be compromised. This state may be determined by the amount of gas in the gas chamber being below the threshold amount. Terms like 'degraded', 'impaired', or 'need for service' may be used to describe this state. It will be appreciated that transitions between a normal state and a degraded state are often not abrupt but may occur gradually over time due to gradual leakage of gas from the gas chamber. Therefore, it is of interest to regularly monitor the amount of gas present in the gas chamber and compare the amount to a predetermined or normal value or range, as indicated by the threshold amount. Beneficially, the state of the suspension system may be used to predict a future point in time when the amount of gas lower than the threshold amount. This allows for service and maintenance to be planned and performed before the suspension system enters a degraded state.

It will be appreciated that this disclosure also relates to other types of pressurized chambers, such as accumulators of vehicle suspension systems, comprising a hydraulic fluid chamber and a gas chamber separated by a movable separator. Similar to what is described above, the method may comprise varying the pressure in the hydraulic chamber and determining a knee point in the sensor data indicating the pressure in the hydraulic fluid chamber. The pressure in the knee point can then be used to determine a state of the suspension system.

In some examples of the present disclosure, a plurality of springs may be provided, wherein each spring couples the chassis of the vehicle to a respective wheel. The plurality of springs may thus comprise a first spring including a first hydraulic fluid chamber and a first gas chamber, and a second spring including a second hydraulic fluid chamber. The pressure in the second hydraulic fluid chamber may be maintained while the pressure in the first hydraulic chamber is being varied. By maintaining the pressure in the second hydraulic fluid chamber, the second spring may carry at least some of the load from the chassis that otherwise would have been carried by the first spring. Put differently, the second spring may be operated in a manner that reduces the load on the first spring while the amount of gas present in first gas chamber is being determined. By reducing the load on the first spring, the first gas chamber is allowed to expand until the separator is bottomed out.

In some examples, the plurality of springs comprises a third spring including a third hydraulic fluid chamber. The second spring and the third spring may couple a respective wheel, arranged diagonally across the vehicle, to the chassis. This arrangement allows for the second and third spring to carry at least some of the load exerted by the chassis on the first spring, allowing the first spring to extend. In some examples, the pressure in the second hydraulic fluid chamber and in the third hydraulic chamber may be increased before the pressure in the first hydraulic fluid chamber is being varied, thereby allowing the chassis to be further raised from the ground as the pressure in the first hydraulic fluid chamber is varied and the knee point determined.

It is to be noted that the pressure in the knee point may be used in several different ways to determine the state of the suspension system. In some examples, the state of the suspension system may be determined by comparing the pressure in the knee point with a reference pressure. If the pressure in the knee point is lower than the reference pressure, this may indicate that gas has leaked out from the gas chamber. If the pressure in the knee point is higher than the reference pressure, this may indicate that hydraulic fluid may have leaked into the gas chamber. In both cases, the performance of the spring or the accumulator may be degraded. In further examples, the state of the suspension system may be determined by calculating a pressure of the gas present in the gas chamber. The calculating may be based at least in part on a predetermined amount of gas in the gas chamber and a predetermined volume of the gas chamber. The calculated pressure may then be compared with the measured pressure in the knee point, and the state of the suspension system determined accordingly. Deviations between the pressure in the knee point and the calculated pressure may indicate a reduced performance of the spring or accumulator.

It is also to be noted that the rate of change of the pressure in the predominantly compressible operating regime, as well as in the predominantly incompressible operating regime, may be used to determine the state of the suspension system. The rate of change of the pressure may be indicative of a spring rate, or stiffness, of a pressurized component of the suspension system, such as a spring. This information may be used to determine that there has been a leakage between the hydraulic fluid chamber and the gas chamber. If compressible gas mixes with the hydraulic fluid, this may increase the compressibility of the hydraulic fluid and thus the compressibility in the predominantly incompressible operating regime. If hydraulic fluid has leaked into the gas chamber, this may reduce the available volume for the gas and hence the compressibility in the predominantly compressible operating regime.

In some examples, the amount of gas present in the first gas chamber may be determined by calculating an amount of substance of the gas based at least in part on the ideal gas law, which describes how gases behave under varying conditions of pressure, volume, and temperature. As mentioned above, the ideal gas law stipulates that the product of the pressure and the volume of a gas is directly proportional to the product of the amount of substance in moles, the ideal gas constant, and the temperature. By determining the pressure in the knee point, the volume of the gas chamber when the separator is bottomed out, and a temperature of the gas, the amount of substance may be calculated. The volume of the gas chamber when the separator is bottomed out may, for example, be provided by a supplier of the spring, whereas the temperature may be approximated by the ambient temperature of the vehicle or retrieved from sensor data provided by a temperature sensor arranged in, or in close vicinity of the gas chamber.

In some examples, the knee point may be determined by identifying a pressure at which the rate of change meets or exceeds a threshold rate. The rate of change may, for example, be described by a time derivative of a mathematical function fitted to the sensor data. The mathematical function may for example be a polynomial, and the time derivative a derivative of the first or second order. In some examples, the knee point may be determined as the point in which the first derivative meets or exceeds a threshold value. In some examples, the knee point may be determined by identifying a maximum of the second derivative.

The pressure in the hydraulic fluid chamber may be varied by controlling a valve in a hydraulic line, coupled to the hydraulic chamber, to gradually remove hydraulic fluid from the chamber or supply hydraulic fluid to the chamber. In some examples, the valve may be flow regulated to allow a predetermined and substantially constant flow of hydraulic fluid to or from the hydraulic fluid chamber.

The techniques described herein can be implemented in a number of ways to determine a state of the suspension system of the vehicle. Examples are provided below with reference to FIGS. 1-6. Examples are discussed in the context of autonomous vehicles; however, the methods, apparatuses, and components described herein can be applied to a variety of components and are not limited to autonomous vehicles. In one example, the techniques described herein may be utilized in driver-controlled vehicles.

FIG. 1 illustrates a view of an example vehicle 100, which is ghosted in broken lines to help illustrate internally positioned components. The vehicle 100 may be a driverless vehicle or a driver-controlled vehicle. The vehicle may be any configuration of vehicle, such as, for example, a van, a sport utility vehicle, a cross-over vehicle, a truck, a bus, an agricultural vehicle, and a construction vehicle. The vehicle 100 may be powered by one or more internal combustion engines, one or more electric motors, hydrogen power, any combination thereof, and/or any other suitable power sources. Although the example vehicle 100 comprises four wheels 101, 102, 103, 104, the systems and methods described herein may be incorporated into vehicles having fewer or greater numbers of wheels, tires, and/or tracks.

The vehicle 100 may travel on a surface, such as, for example, any road surface (e.g., tarmac, asphalt, gravel, etc.). The surface may include areas of unevenness, such as, for example, a depression (e.g., a pothole or a dip in the surface) or a bump or protrusions (e.g., a speed bump or heave in the surface). As the vehicle 100 travels across such uneven regions, the surface exerts a force on the wheel or wheels 101-104 that is transmitted through the wheel(s) 101-104 to a chassis 105 of the vehicle via a suspension system 10 coupling the wheels 101-104 to the vehicle chassis 105.

As shown in FIG. 1, the suspension system 10 comprises a plurality of springs 110, 120, 130, 140, each coupling the chassis 105 of the vehicle 100 to a respective wheel 101, 102, 103, 104 of the vehicle 100. Thus, as illustrated in FIG. 1, a first spring 110 couples a first wheel 101 to the chassis 105, a second spring 120 couples a second wheel 102 to the chassis 105, a third spring 130 couples a third wheel 103 to the chassis 105, and a fourth spring 140 couples a fourth wheel 104 to the chassis 104. The first and second wheels 101, 102 may be arranged at a front end of the vehicle 100 and the third and fourth wheels 103, 104 may be arranged at a rear end of the vehicle 100. The springs 110-140 may be arranged to allow the wheels 101-104 to move relative to the chassis 105, for example in response the wheels encountering road irregularities and areas of unevenness. However, it is to be noted that other configurations are also possible. The vehicle 100 may, for example, comprise less than four wheels or more than four wheels. Further, a wheel may be coupled to the chassis by two or more springs.

The first spring 110 may comprise a first hydraulic fluid chamber 111 that may be divided by a first damper piston 116 into a first damper retraction chamber 112 and a first damper extension chamber 113. Further, the first spring 110 may comprise first gas chamber 114 which may be separated from the hydraulic fluid chamber 111 by a first separator 115. Other configurations are however possible, such as the first spring 110 comprising two or more hydraulic fluid chambers or two or more gas chambers.

The second, third and fourth springs 120, 130, 140 may have a similar configuration, in which: the second spring 120 comprises a second hydraulic fluid chamber 121 that is divided by a second damper piston 126 into a second damper retraction chamber 122 and a second damper extension chamber 123, as well as a second gas chamber 124 which is separated from the second hydraulic fluid chamber 121 by a second separator 125; the third spring 130 comprises a third hydraulic fluid chamber 131 that is divided by a third damper piston 136 into a third damper retraction chamber 132 and a third damper extension chamber 133, as well as a third gas chamber 134 which is separated from the third hydraulic fluid chamber 131 by a third separator 135; and in which fourth spring 140 comprises a fourth hydraulic fluid chamber 141 that is divided by a fourth damper piston 146 into a fourth damper retraction chamber 142 and a fourth damper extension chamber 143, as well as a fourth gas chamber 144 which is separated from the fourth hydraulic fluid chamber 141 by a fourth separator 125.

The operation of the springs 110-140 may be controlled by a suspension control system 161, which may be configured to supply hydraulic fluid from a pressurized fluid source 162 (e.g., a hydraulic pump) to the springs 110-140 and discharge hydraulic fluid to a hydraulic fluid reservoir 163. In the present example, there is provided a suspension control system 161 for each axle of the vehicle 100, such that a first suspension control system 161 is arranged to control the operation of the first and second springs 110, 120 at the front axle of the car 100 and a second suspension control system 161 is arranged to control the operation of the third and fourth springs 130, 140 at the rear axle of the car 100. There may be provided a separate pressurized fluid source 162 for each of the suspension control systems 161 or a pressurized fluid source 161 that is common to both suspension control systems 161. Similarly, there may be provided a separate reservoir 163 for each of the suspension control systems 161, or one that is common to both. In further examples, there may be provided a single suspension control system 161 that is common to all four springs 110-140 of the exemplary vehicle 100 illustrated in FIG. 1.

In the following, the function and structure of the springs 110-140 of the suspension system 10 will be discussed with reference to the first spring 110. It will however be appreciated that this description may be equally applicable to any of the springs 110-140 depicted in FIG. 1.

In some examples, the spring 110 may be coupled to a suspension control arm, which is coupled to the wheel 101 such that extension and retraction of the spring 110 may cause the wheel 101 to respectively extend away from the chassis 105 (e.g., raising the chassis 105 relative to the ground) and retract closer to the vehicle chassis 105 (e.g., lowering the vehicle chassis 105 relative to the ground).

The spring 110 may be a hydropneumatic spring 110 comprising a spring cylinder 117 and a damper cylinder 118, wherein the spring cylinder 117 may be telescopically arranged within the damper cylinder 118 to allow the spring 110 to extend and retract. Thus, the damper cylinder 117 may be mechanically coupled to the wheel 101 and the spring cylinder 118 may be mechanically coupled to the chassis 105, or vice versa. The damper cylinder 118 and the spring cylinder 117 may form a spring 110 with a combined spring and damper functionality, as will be described in the following with reference to FIG. 1. The spring 110 depicted in FIG. 1 may also be referred to as a strut.

The damper cylinder 118 and the spring cylinder 117 may together define the hydraulic fluid chamber 111, which may have a volume that varies as the spring 110 extends and retracts. In the present example, the hydraulic fluid chamber 111 defines the damper extension chamber 113 and the damper retraction chamber 112, which comprises hydraulic fluid. The damper extension chamber 113 is defined at least in part by an inner wall of the damper cylinder 118, whereas the damper retraction chamber 112 is defined at least in part by an inner wall of the spring cylinder 117, which is arranged in the damper cylinder 118 and movable along a length axis of the damper cylinder 118. The extension chamber 113 and the retraction chamber 112 are separated from each other by the damper piston 116, which may be coupled to the spring cylinder 117 such that the spring cylinder 117 and the damper piston 116 move relative to the damper cylinder 118 as the spring extends and retracts. In different words, the damper piston 116 is configured to divide the hydraulic fluid chamber 111 into the extension chamber 113 and the retraction chamber 112 such that movement of the piston 116 varies the volumes of the extension chamber 113 and the retraction chamber 112.

The damper piston 116 may be sealed to an interior surface of the damper piston 118 and may comprise one or several passages, or channels (not shown), configured to fluidically connect the extension chamber 113 and the retraction chamber 112. As the volumes of the extension chamber 113 and the retraction chamber 112 vary, a pressure differential may be generated over the damping piston 116, which may cause the hydraulic fluid in the hydraulic fluid chamber 111 to flow from one side of the damper piston 116 to the opposite side of the piston 116, i.e., from the extension chamber 113 to the retraction chamber 114, or vice versa. For example, during extension of the spring 110 (i.e., when the wheel 101 moves away from the chassis 105), hydraulic fluid may flow through the passage from the retraction chamber 112 into the extension chamber 113, causing the volume of the extension chamber 113 to increase. Similarly, during retraction of the spring 110 (i.e., when the wheel 101 moves towards the chassis 105), hydraulic fluid may flow from the extension chamber 113 into the retraction chamber 112, causing the volume of the retraction chamber 112 to increase. The passage may provide a flow resistance that acts to dampen the movement of the damper piston 116 relative to the damper cylinder 118.

The spring cylinder 117 may further comprise the gas chamber 114, which may be separated from the retraction chamber 112 by the movable separator 115. In the present example, an end of the spring cylinder 117 facing away from the damper cylinder 118 may be closed such that the gas chamber 114 is defined between the closed end of the spring cylinder 117 and the separator 115. The separator 115 may be understood as a piston or membrane that can move relative to the spring cylinder 117 and the damper cylinder 118, and whose position may be determined at least in part by the interaction of forces from the gas in the gas chamber 114 and the hydraulic fluid in the retraction chamber 112. In some examples, the separator 115 may be referred to as a floating piston 115.

In the example of FIG. 1, an increased pressure in the hydraulic fluid chamber 111 (and hence in the retraction chamber 112) of the spring 110 may cause the separator 115 to move to compress the gas in the gas chamber 114. Accordingly, a decreased pressure in the hydraulic fluid chamber 111 may cause the separator 115 to move to reduce the pressure in the gas chamber 114. Beneficially, this arrangement allows the gas chamber 114 to absorb and release energy from relative movements between the wheel 101 and the chassis 105.

The separator 115 in the spring 110 depicted in FIG. 1 may be formed as a piston that is sealed against the interior wall of the spring cylinder 117. The sealing may be provided to hinder hydraulic fluid from entering the gas chamber 114 and gas from escaping the gas chamber 114 and leaking into the hydraulic fluid chamber 111.

In examples wherein the damper functionality is provided by a component that is separate from the spring 110, the damper piston 116 may be omitted and the hydraulic fluid allowed to flow between the retraction chamber 112 and the extension chamber 113 without a damping flow resistance. Put differently, the retraction chamber 112 and the extension chamber 113 may be joined to form a common fluid chamber 111, and the damping provided by a structurally separate damper component that is coupled between the wheel 101 and the chassis 105 (not shown in FIG. 1).

The suspension control system 161 is configured to control one or more components of the suspension system 10, as described herein. For example, the suspension control system 161 may be configured to supply hydraulic fluid from a pressurized fluid source 162 (e.g., a hydraulic pump) to the hydraulic fluid chamber 111, and discharge hydraulic fluid from the hydraulic fluid chamber 111 to a hydraulic fluid reservoir 163. The addition and/or removal of hydraulic fluid from the hydraulic fluid chamber 111 may be controlled by an actuator controller (not shown) and one or more hydraulic control valves 181, which may be operated to regulate the amount of the hydraulic fluid in the hydraulic fluid chamber 111. The amount of hydraulic fluid in the hydraulic fluid chamber 111 can be regulated to adjust the height of the vehicle based on, for example, load and driving conditions. A higher load may compress the springs 110-140, decreasing the height of the vehicle 100, whereas a lower load may allow the springs 110-140 to expand, increasing the vehicle's height 100. The suspension control system 161 can be operated to compensate for these changes to keep the vehicle 100 at a consistent ride height. Similarly, an uneven distribution of the load of the chassis 105 may cause the vehicle 100 to tilt. This can also be adjusted by the suspension control system 161, which may be operated to add or remove hydraulic fluid from one or more of the springs 110-140 to level the vehicle 100. The suspension control system 161 may further be configured to make dynamic adjustments of the springs 110-140 while the vehicle 100 is in motion. For instance, the suspension control system 161 can raise the vehicle 100 for better ground clearance on rough terrain or lower the vehicle 100 for improved aerodynamics and stability at high speeds. The actuator controller and the hydraulic control valve 181 may also be employed to increase or reduce the amount of hydraulic fluid in the hydraulic fluid chamber 111 during the above-described process of varying the pressure to detect the knee point in which the separator 115 is bottomed out. This procedure will be described in more detail in the following.

The hydraulic fluid may be conveyed in one or more first fluid lines 171 extending between the spring 110 and the suspension control system 161. A second fluid line 172 may be arranged to supply the suspension control system 161 with pressurized hydraulic fluid from the pressurized fluid source 162 and a third fluid line 173 may be arranged to allow hydraulic fluid to return to the reservoir 163. In some examples, the hydraulic fluid in the reservoir may be returned to the pressurized fluid source for recirculation to the suspension control system 161.

The suspension system 10 may further comprise an accumulator 150, comprising a housing 157 accommodating a pressurized chamber which may be divided into a gas chamber 152 configured to be filled with a pressurized gas and a hydraulic fluid chamber 151 configured to accommodate hydraulic fluid. The hydraulic fluid chamber 151 may be fluidically connected to the pressurized fluid source 162 and the suspension control system 161 via the second fluid line 172.

The gas may be separated from the hydraulic fluid in the pressurized chamber by a separator 155, such as a piston or a membrane. Beneficially, the accumulator 150 may serve as a storage device assisting in regulation hydraulic fluid pressure in the system. When the system pressure is higher than the charge pressure in the accumulator 150 (i.e., the pressure in the gas chamber 152), the hydraulic fluid may flow into the hydraulic fluid chamber 151 of the accumulator 150, compressing the gas and storing energy. When the system pressure drops, the compressed gas may expand and push the stored hydraulic fluid back into the system, maintaining the system pressure. The accumulator 150 may also serve as a system protection device absorbing pressure spikes and storing excess fluid.

The pressure in the hydraulic fluid chamber 151 of the accumulator 150 may be determined based at least in part on sensor data from a pressure sensor 183. The pressure sensor 183 may be arranged to measure a pressure in the second fluid line 172, connecting the accumulator 150 to the pressurized fluid source 162 and the suspension control system 161. Examples of pressure sensors include strain gauge sensors and capacitive sensors. The pressure in the accumulator 150 may be regulated by a valve arrangement in the suspension control system 161, allowing the hydraulic fluid to be gradually discharged from the hydraulic fluid chamber 151 while the pressure is monitored by the pressure sensor 183.

In the following, a procedure for determining a state of the suspension system 10 by varying and monitoring the pressure in a pressurized component of the suspension system will be described. The pressurized component may, for example, be any of the springs 110-140 coupling the wheels to the chassis 105, and/or the accumulator 150. The determined state may be used as input for performing an action associated with the vehicle, such as indicating the suspension system is functioning as designed or that there is (or will be a future) need for maintenance. Further examples with be discussed in connection with FIG. 5.

The procedure may include to vary the pressure in the hydraulic fluid chamber of the component, such as the hydraulic fluid chamber 111 of the spring 110 or the hydraulic fluid chamber 151 of the accumulator 150 (in the following collectively referred to as 'the hydraulic fluid chamber'). The pressure may for example be reduced from a relatively high pressure to a relatively low pressure to allow the gas in the gas chamber 114 of the spring 110 or the gas chamber 152 of the accumulator 150 to expand and push the separator 115, 155 towards its end position, in which the separator 115, 155 is bottomed out. This position may be considered to represent the largest volume possible of the gas chamber 114, 152 and indicate the end of a predominantly compressible operating regime of the spring 110 or accumulator 150. After the separator has been bottomed out, the spring 110 or accumulator 150 may, due to the incompressible nature of the hydraulic fluid, exhibit a predominantly incompressible response to a further reduction of the pressure. Alternatively, or additionally, the pressure may be increased from a relatively low pressure in which the separator 115, 155 is bottomed out and the spring 110 or accumulator 150 is arranged in the predominantly incompressible operating regime, to a relatively high pressure in which the spring 110 or accumulator 150 is arranged in the predominantly compressible operating regime. In some examples, the procedure may include a sequence in which the pressure first is reduced to bottom out the separator 115, 155 and thereafter increased to move the separator 115, 155 away from the end position. A reversed sequence is also possible, in which the pressure first is increased to move the separator 115, 155 away from the end position and thereafter reduced to bottom out the separator 115, 155. The pressure may be varied over a period of time in a controlled manner, in which the pressure may decrease steadily in small increments until it reaches a desired level.

The pressure in the hydraulic fluid chamber 111, 151 may be indicated by sensor data received from, for example, a first pressure sensor 182 in the first fluid line 171 or the second pressure sensor 183 in the second fluid line 172, respectively. The sensor data may be acquired over the period of time and be used to determine a knee point in a change of pressure in the hydraulic fluid chamber during the reducing and/or increasing of the pressure (an example of a knee point is discussed below with reference to FIG. 2). The knee point can be indicative of a change from the predominantly compressible operating regime to the predominantly incompressible operating regime of the spring 110 or accumulator 150 and may thus be used for determining when the separator 115, 155 reaches or leaves its end position. The pressure in the knee point may then be used to determine that an amount of gas present in the gas chamber meets or exceeds a threshold amount.

In case the component is an accumulator 150, the accumulator may be disconnected from the pressurized fluid source 162 as the hydraulic fluid in the hydraulic fluid chamber 151 is bled off or increased by a valve controlled by the suspension control system. Sensor data from the second pressure sensor 183 may be monitored during the varying of the pressure in the hydraulic fluid chamber 151 to determine the pressure at which the separator 155 reaches or leaves its end position. This pressure may be used for determining a state of the suspension system, for example by comparing the pressure with a reference pressure or by calculating an estimated amount of gas present in the gas chamber 152, using a predetermined volume of the gas chamber 152 as input, and comparing the estimated amount of gas with a threshold amount. Alternatively, or additionally, this pressure may be compared with a predetermined pressure, such as an initial pressure supplied to the gas chamber during, e.g., maintenance or refilling of the gas chamber 152. In further examples, the pressure corresponding to the separator 155 reaching or leaving its end position may be compared with a reference pressure which may be calculated based on, for example, a predetermined amount of gas, or reference amount (e.g., corresponding to an amount initially supplied to the gas chamber 152). Should the knee point pressure be lower than the reference pressure or the calculated reference pressure, this may indicate that at least some of the gas has leaked out and that the performance of the suspension system 10 may be degraded.

A similar procedure may be employed in case the component is a spring, such as the first spring 110 of the plurality of springs indicated in FIG. 1. Accordingly, the pressure in the first hydraulic fluid chamber 111 of the first spring 110 may be varied, for instance by means of the valve 181 controlled by the suspension control system 161, while the change in pressure is monitored by the first pressure sensor 181 to identify a pressure corresponding to the separator 115 reaching or leaving its end position, in which it is bottomed out. As mentioned above, this pressure can then be used to determine a state of the first spring 110, for example by comparing the pressure with a predetermined or calculated reference pressure or by calculating an amount of gas present in the gas chamber 114 and comparing the amount with a predetermined value.

It may also be possible to determine a state of the suspension system based at least in part on a rate of change on either side of the knee point, i.e., in the predominantly compressible operating regime and in the predominantly incompressible operating regime, respectively. The rate of change of the pressure may be indicative of a spring rate, which may be understood as the force needed to compress or extend the spring by a certain distance. Put differently, the rate of change of the pressure may describe the stiffness of the spring. This information may be used to determine if there has been a leakage between the hydraulic fluid chamber 111 and the gas chamber 114, such that a leakage of hydraulic fluid into the gas chamber 114 and/or a leakage of gas into the hydraulic fluid chamber 111. If compressible gas leaks into the hydraulic fluid chamber 111 and mixes with the hydraulic fluid, the gas may increase the compressibility of the hydraulic fluid. This increase in compressibility may be observed as a reduced rate of change in pressure in the predominantly incompressible operating regime, i.e., when the separator 115 has been bottomed out. Correspondingly, if hydraulic fluid leaks into the in the gas chamber 114, it may reduce the available volume of the for the gas. This may be observed as an increased rate of change in pressure in the predominantly compressible operating regime, i.e., when the separator 115 is not bottomed out. Further, a leakage of hydraulic fluid into the gas chamber 114 may also be observed as an increased knee point pressure. Thus, by determining the rate of change in the pressure in the respective operating regimes and comparing the rates with reference values, a state of health of the suspension system may be determined.

In some examples, one or more of the other springs 120-140 of the suspension system 10 may be used to assist in the determining of the state of the first spring 110. In an example, the pressure in the second spring 120, i.e., the pressure in the second hydraulic fluid chamber 121, may be maintained during the varying of the pressure in the first spring 110 to reduce at least some of the load on the first spring 110. In some examples, the pressure in the second spring 120 may be increased prior to, or during, the varying of the pressure in the first spring 110 to further reduce the load exerted by the chassis 105 on the first spring 110.

A similar approach may be applied to the third spring 130 and/or the fourth spring 140. which may be used in a similar way as the second spring 120 to further facilitate the determining of the state of the first spring 110. Hence, the pressure in the hydraulic fluid chamber of the third spring 130 and/or the fourth spring 140 may in some examples be maintained or increased to reduce the load on the first spring 110. Reducing the load may be beneficial to allow the pressure in the hydraulic chamber 111 of the first spring 110 to be reduced.

In some examples, pressure variations in one or more of the other springs 120, 130, 140 may be monitored during the testing of the first spring 110. Pressure variations in any of the other springs 120, 130, 140 may indicate that the vehicle 100 is being moved, such as rocked by a gust of wind or a person. As such movements may interfere with the determining of the state of the first spring 110, for example by triggering false detections of the knee point, detected movements of the vehicle 100 may trigger the testing of the first spring 110 to be reset and started over.

A test cycle may be performed to determine the state of each of the plurality of springs 110-140 of the suspension system 10 of the vehicle 100. In a first phase of the test cycle, the first spring 110 is tested while one or more of the other springs 120-140 are operated to reduce the load on the first spring 110. Thereafter, the second spring 120 may be tested while one or more of the first, third, and fourth springs 110, 130, 140 are operated to reduce the load on the second spring 120. In a following phase, the third spring 130 may be tested while at least one of the remaining springs 110, 120, 140 is operated to reduce the load on the third spring 130. Finally, the fourth spring 140 may be tested while the load from the chassis 105, carried by the fourth spring 140, is reduced by one or more of the first, second and third springs 110, 120, 130. Test testing of each spring 110-140 may typically include to gradually reduce the pressure in the hydraulic fluid chamber, detect the knee point, and determine that an amount of gas present in the gas chamber meets or exceeds a threshold amount, as described above. This test cycle allows for the state of each of the springs 110-140 of the suspension system to be determined and an action, associated with the vehicle, to be performed accordingly. Additionally, or alternatively, the test cycle may include determining a state of the accumulator 150, as discussed above. The state of the accumulator 150 may hence be determined as a part of the procedure in which the state of the springs 110-140 is determined, or in a separate procedure not including determining the state of the springs 110-140.

Figure 2:
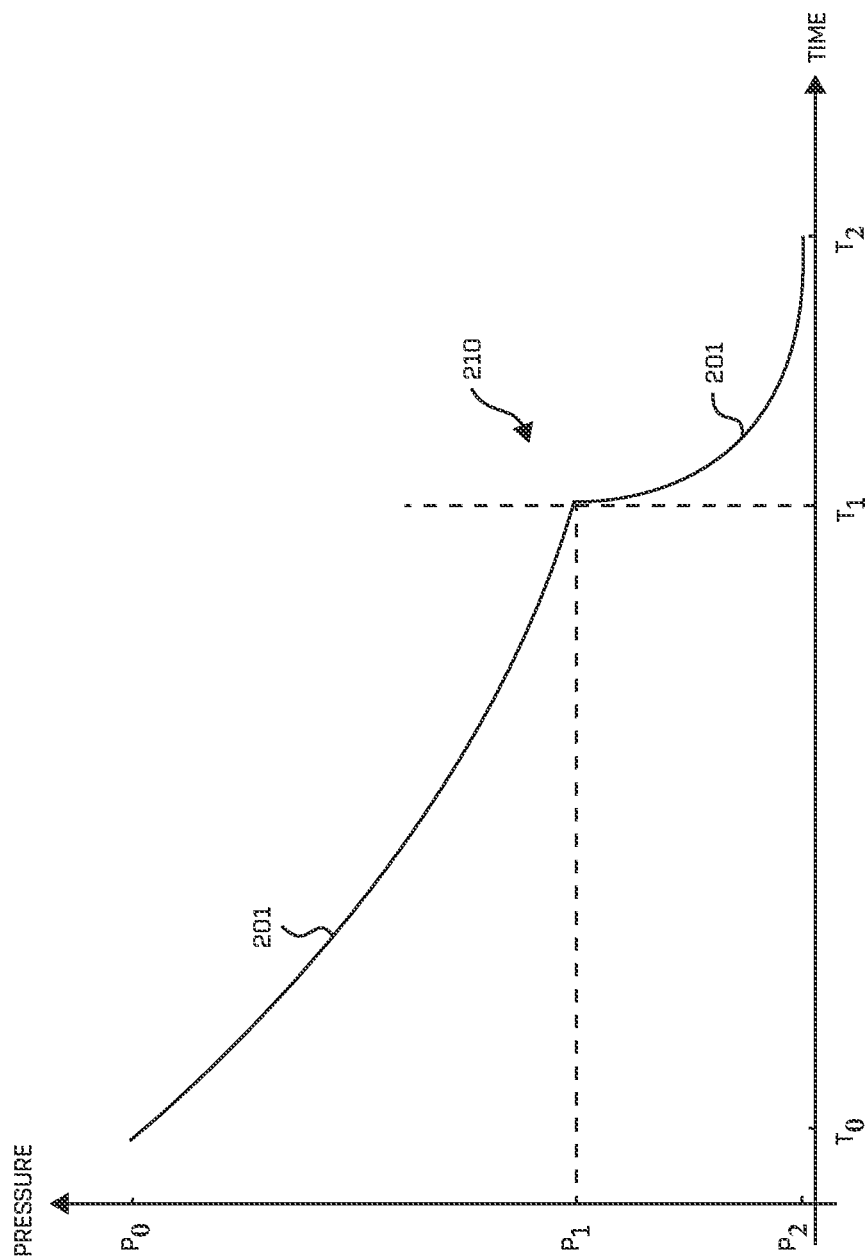
FIG. 2 is a graph illustrating a pressure in a hydraulic fluid chamber of a suspension system as a function of time.

FIG. 2 is a graph illustrating the change in pressure in the hydraulic fluid chamber 111 of the spring 110 as described above in connection with FIG. 1. The change in pressure is plotted as a function of time as the pressure in the hydraulic fluid chamber 111 is varied, such as reduced, to determine a state of the spring 110. It will however be appreciated that the graph depicted in the FIG. 2 may as well illustrate the change in pressure in the hydraulic fluid chamber 151 of the accumulator 150 in FIG. 1, as the pressure in the hydraulic fluid chamber 151 is gradually reduced to determine a state of the accumulator 150. While the following discussion uses the spring 110 as an example, the reasoning is equally applicable to the accumulator 150.

The graph in FIG. 2 is based on sensor data received from a sensor arranged to measure a pressure indicating a pressure in the hydraulic fluid chamber 111. As illustrated in FIG. 1, the sensor may in some examples be a first sensor 182 arranged to measure a pressure in a first hydraulic fluid line 171 connecting the hydraulic fluid chamber 111 of the spring 110 to the suspension control system 161 (in case of the hydraulic fluid chamber is part of an accumulator 150, the sensor data may be received from the second sensor 183 arranged to measure the pressure in the second hydraulic fluid line 172 connecting the hydraulic fluid chamber 151 of the accumulator 150 to the suspension control system 161 and/or pressurized fluid source 162). A mathematical function, such as a polynomial function, may be fitted to data points of the sensor data to facilitate analysis of the data. The graph in the present example may hence be a representation of the mathematical function fitted to the sensor data.

The graph illustrates the pressure in the hydraulic fluid chamber 111 over a period of time, from $t_0$ to $t_2$, during which the hydraulic fluid is gradually bled off from the hydraulic fluid chamber 111. During this period, the pressure in the hydraulic fluid chamber 111 decreases from an initial pressure level $p_0$ to a reduced pressure level $p_2$. Initially, between $t_0$ and $t_1$, a gradual decrease in pressure from $p_0$ down to $p_1$ may be observed. This corresponds to the separator 115 being pushed by the compressed gas in the gas chamber 114 towards its end position. The reduction of volume of the hydraulic fluid in the hydraulic fluid chamber 111 may be compensated by a corresponding expansion of the volume of the gas chamber 114. This phase may be referred to as a compressible operating regime 201, in which the change in pressure is dominated by the compressibility of the gas.

At $t_1$, a knee point 210 can be observed in the sensor data. The knee point 210 may be understood as a specific point or region in the pressure-time graph where there is a sudden change or deviation in the pressure trend. In the present example, the knee point 210 appears as a sharp bend or inflection point in the graph, indicating a sudden drop in the pressure. The knee point 210 indicates a transition from the predominantly compressible operating regime 201 of the spring 110 to a predominantly incompressible operating regime 201. Mechanically, this transition may be understood as the separator 115 being bottomed out, i.e., reaching its end position after which the gas chamber 114 cannot expand any further. Any further reduction of the volume of the hydraulic fluid in the hydraulic fluid chamber 111 may therefore result in a more rapid pressure change, as compared to what would be the case in the compressible regime 201.

The knee point 210 may, for example, be determined by identifying the point in which the rate of change meets or exceeds a threshold rate. The change rate may, for example, be described by a time derivative of the mathematical function fitted to the sensor data. Hence, by monitoring the rate of change from to and onwards, the knee point 210 may be identified as the point $t_1$ in which the there is a rapid increase in change rate, corresponding to the first derivative of the pressure-time function in FIG. 1 meeting or exceeding a threshold. In some examples, the second derivative may be determined, and the knee point 210 identified as the point corresponding to a maximum of the second derivative. However, it will be appreciated that the above techniques for determining the knee point 210 are merely illustrating examples and that other techniques, readily known to the person skilled in the art, also are possible.

The pressure $p_1$ in the knee point 210 may hence be considered to represent the pressure in the gas chamber 114 at $t_1$, when the separator 115 reaches its end position. The knee point pressure $p_1$ and the volume of the gas chamber 114 may be used for calculating the amount of gas present in the gas chamber 114. This may, for example, be achieved by using the ideal gas law:

$$pV=nRT \quad \text{(Eq. 1)}$$

where p is the pressure, V is the volume, n is the amount of substance, R is the ideal gas constant, and T is the absolute temperature of the gas. The temperature may, for instance, be the ambient temperature in Kelvin or based on temperature data provided by a temperature sensor arranged at the hydraulic fluid chamber 114 or in close vicinity of the same.

The present disclosure is based on the realization that the knee point 210 can be used to determine both volume $V_1$ and pressure $p_1$ of the gas chamber 114 at a certain time. The volume $V_1$ may be a known parameter given by the fact that the separator is arranged in a known position, i.e., the end position. This allows the amount of substance n to be determined based on the volume $V_1$ and the pressure $p_1$:

$$n = \frac{p_1 V_1}{RT} \quad \text{(Eq. 2)}$$

The calculated amount of substance may be compared with a reference amount, and the state of the spring 110 determined based, at least in part, on the comparison. In case the calculated amount is below the threshold amount, the state of the spring 110 may be determined as 'degraded' or 'impaired'. In case the calculated amount meets or exceeds the threshold, the state of the spring 110 may be determined as 'operational' or 'normal'.

In an example of an operational spring, the initial pressure $p_0$ may be set to about 100 bar and the knee point pressure $p_1$ be measured to about 30 bar. Further, the volume $V_1$ of the gas chamber may be about 550 milliliters. Should the knee point pressure $V_1$ deviate by, for example, 5 bar, such that the measured knee point pressure $V_1$ is 25 bar or less, or 35 bar or more, this may indicate that the spring 110 is in a degraded state. It is to be noted that the spring 110 according to the present example may have been provided with an initial amount of gas that, when occupying the volume $V_1$, has a pressure of 30 bar. The spring 110 may thus be considered as being 'pre-charged' to 30 bar. A lower knee point pressure $p_1$ may indicate that gas has leaked out from the gas chamber 114, whereas a higher knee point pressure $p_1$ may indicate that hydraulic fluid has leaked into the gas chamber 114.

It will be appreciated that Equation 1 and 2 above merely are illustrating examples and that the amount of gas present in the gas chamber 114 may be determined in other ways. In some examples, the amount of substance may not be determined. Instead, a reference amount of substance no, such as the amount of substance initially supplied to the gas chamber 114, may be used together with the volume $V_1$ to calculate a pressure $p_1'$:

$$p_1' = \frac{n_0 RT}{V_1} \quad \text{(Eq. 3)}$$

The calculated pressure knee point pressure $p_1'$ can then be compared with the measured knee point pressure $p_1$ and the state of the spring 110 determined based, at least in part, on the comparison. In case the calculated pressure $p_1'$ exceeds the measured pressure $p_1$, the state of the spring 110 may be determined as 'degraded' or 'impaired'. In case the calculated pressure $p_1'$ meets or is below the measured pressure $p_1$, the state of the spring 110 may be determined as 'operational' or 'normal'.

In some examples, the volume $V_1$ of the gas chamber 114 may not necessarily be known. Instead, the volume $V_1$ may be replaced with a constant and the relative change or drift in calculated amount of substance monitored over time. A degraded or impaired spring 110 may then be determined in case the calculated amount of substance deviates from a reference amount by a predetermined degree.

Other models and relations may also be used, such as the previously mentioned van der Waals equation:

$$\left(P + a\frac{n^2}{V^2}\right)(V - nb) = nRT \quad \text{(Eq. 4)}$$

where a is a constant whose values depends on the type of gas and b is the volume occupied by the molecules of one mole.

The pressure in the hydraulic fluid chamber 111 may be varied monotonically to determine the knee point. As indicated in FIG. 2, the pressure may be reduced from $P_0$ to $P_2$ between $T_0$ and $T_2$ without any intermediate pressure increases. Alternatively, the pressure may be increased monotonically from, for example, $P_2$ to $P_0$ between $T_0$ and $T_2$, without any intermediate pressure reductions. It may also be possible to perform the pressure variations in a sequence, in which the pressure in a first phase may be reduced from $P_0$ to $P_2$ and in a following, second phase be increased from $P_2$ to $P_0$, or vice versa. In different words, the spring 110 or accumulator 150 may be switched two or more times between the predominantly compressible operating regime and the predominantly incompressible operating regime, thereby passing the knee point two or more times. In case there is a difference in knee point pressure $p_1$ depending on from which direction the knee point is passed, i.e., if the knee point is passed from a higher pressure or a lower pressure, the knee point pressure $p_1$ may be determined as an average of the two readings. Any difference in the readings may indicate presence of hysteresis, which for example may be caused by stiction or kinetic friction between the separator 115 and the spring cylinder 117. Hence, by monitoring hysteresis in the sensor data indicating the pressure in the hydraulic fluid chamber 111 as the spring 110 is switched between the predominantly compressible operating regime and the predominantly incompressible operating regime, the friction, such as the stiction and/or kinetic friction between the separator 115 and the spring cylinder 117 may be determined. As the friction may indicate the performance of a sealing between the separator 115 and the inner wall of the spring cylinder 117, preventing gas from leaking into the hydraulic fluid and vice versa, a state of health of the spring may be determined based at least in part on the hysteresis (and hence the friction). A relatively high friction may indicate an effective seal, whereas a relatively low friction may indicate a leaky seal.

FIGS. 3A and B show a spring of a suspension system of a vehicle, such as the spring 110 described above with reference to FIGS. 1 and 2. FIG. 3A shows the spring 110 in its compressible operating state, in which the hydraulic fluid in the hydraulic fluid chamber 111 has a relatively high pressure $p_0$ that causes the separator 115 to compress the gas in the gas chamber 114, whereas FIG. 3B shows the spring 110 after the pressure in the hydraulic fluid chamber 111 has been reduced to a pressure $p_1$ corresponding to the knee point in which the separator 115 reaches its end position and the spring 110 assumes its substantially incompressible operating state. Put differently, FIG. 3B shows the spring 110 at a time $t_1$ corresponding to the knee point 210 in FIG. 2.

As previously mentioned, the spring 110 typically comprises a spring cylinder 117 that is telescopically arranged in a damper cylinder 118, such that the spring 110 can retract and extend along a length axis of the spring cylinder 118 and the damper cylinder 119. During operation, the hydraulic fluid may fill the hydraulic fluid chamber 111, which is divided by the damper piston 116 into the retraction chamber 112 and the extension chamber 113. The damper piston 116 may be attached to the spring cylinder 117 such that the damper piston 116 moves through the hydraulic fluid chamber 111 as the spring 110 extends and retracts. The damper piston 116 is configured to allow a flow of hydraulic fluid to pass through the damper piston 116, from the retraction chamber 112 to the extension chamber 113 (in case of the spring extending), and from the extension chamber 113 to the retraction chamber 112 (in case of the spring retracting). As previously discussed, the flow resistance through the damper piston may act to dampen oscillations of the spring 110.

The gas chamber 114 may be prefilled with a gas, such as nitrogen, to an amount which may correspond to the reference amount, or initial amount, of substance no discussed above in connection with Equation 3. The gas chamber 114 is separated from the hydraulic fluid chamber 111 by a movable separator 115, which is configured to move to compress the gas in response to an increased pressure in the hydraulic fluid chamber 111 and to expand the gas chamber 114 in response to a reduced pressure in the hydraulic fluid chamber 111. In FIG. 3A, the separator 115 is arranged in a position in which the gas chamber 114 is compressed to a relatively small volume $V_0$, whereas in FIG. 3B the separator 115 is bottomed out and thereby arranged in a position in which the gas chamber 114 has a maximum volume $V_1$. This maximum volume $V_1$ may be defined by the mechanical dimensions of the spring cylinder 117 and the and therefore known. FIG. 3A may therefore be considered to show the spring 110 in a predominantly compressible operating state in which the separator 115 moves in response to pressure variations in the hydraulic fluid chamber 111, whereas FIG. 3B may be considered to show the spring 110 in a predominantly incompressible operating state in which pressure changes in the hydraulic fluid chamber 111 may not result in the separator 115 moving.

Various types of separators 115 may be used to prevent the gas from escaping the gas chamber 114. The separator 115 may, for example, be formed as a floating piston which is sealed against the interior wall of the spring cylinder 117 and allowed to move along the length axis of the spring cylinder 117 as the pressure in the hydraulic fluid chamber 111 varies. The separator 115 may also be formed as a membrane separator, or a diaphragm separator, utilizing a flexible membrane to create a barrier between the hydraulic fluid and the gas.

Figure 4B:
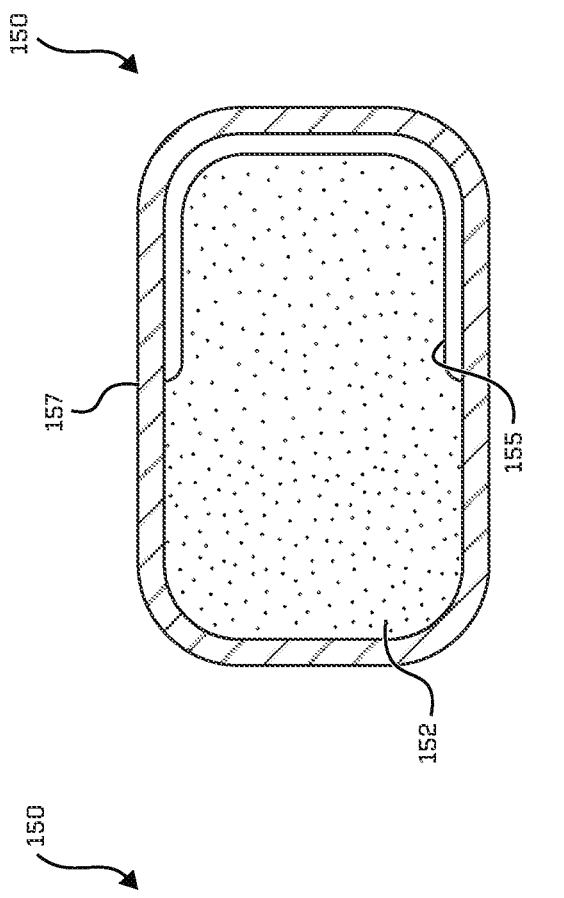
FIG. 4B schematically illustrates the accumulator when arranged in a predominantly incompressible operating regime.
Figure 4A:
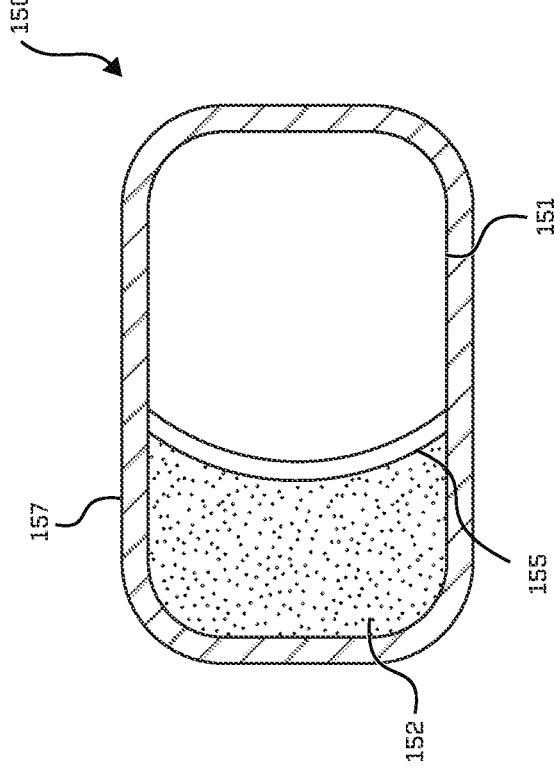
FIG. 4A schematically illustrates an accumulator of the suspension system when arranged in a predominantly compressible operating regime.

Similarly, FIGS. 4A and B show an accumulator of a vehicle suspension system, such as the accumulator 150 described above with reference to FIGS. 1 and 2. FIG. 4A shows the accumulator 150 when the hydraulic fluid in the hydraulic fluid chamber 151 has a relatively high pressure $p_0$ causing the separator 115 to compress the gas in the gas chamber 152, whereas FIG. 4B shows the accumulator 150 after the pressure in the hydraulic fluid chamber 151 has been reduced to a pressure $p_1$ corresponding to the knee point in FIG. 2, in which the separator 155 has been bottomed out.

The accumulator 150 typically comprises a housing 157 defining a pressurized chamber comprising the hydraulic fluid chamber 151 and the gas chamber 152. During operation, hydraulic fluid is accommodated in the hydraulic fluid chamber 151, whereas the gas chamber 114 may be prefilled with a gas, such as nitrogen. The amount of gas initially supplied to the gas chamber 152 may correspond to the reference amount of substance no discussed above. The gas and the hydraulic fluid may be kept apart by a separator 155, such as a flexible membrane, which may compress the gas in response to an increased pressure in the hydraulic fluid chamber 151 (such as indicated in FIG. 4A) and to expand the gas chamber 152 in response to a reduced pressure in the hydraulic fluid chamber 151, until the separator 155 reaches its end position indicated in FIG. 4B. In FIG. 4A the gas chamber is compressed to a relatively small volume $V_0$ and in FIG. 4B the gas chamber has been expanded to assume its maximum volume $V_1$. By gradually reducing the pressure in the hydraulic fluid chamber 151, the pressure at which the separator is bottomed out can be determined and the state of the accumulator determined as discussed above in connection with FIGS. 3A and B. Details of such a determination is therefore not repeated here.

Figure 5:
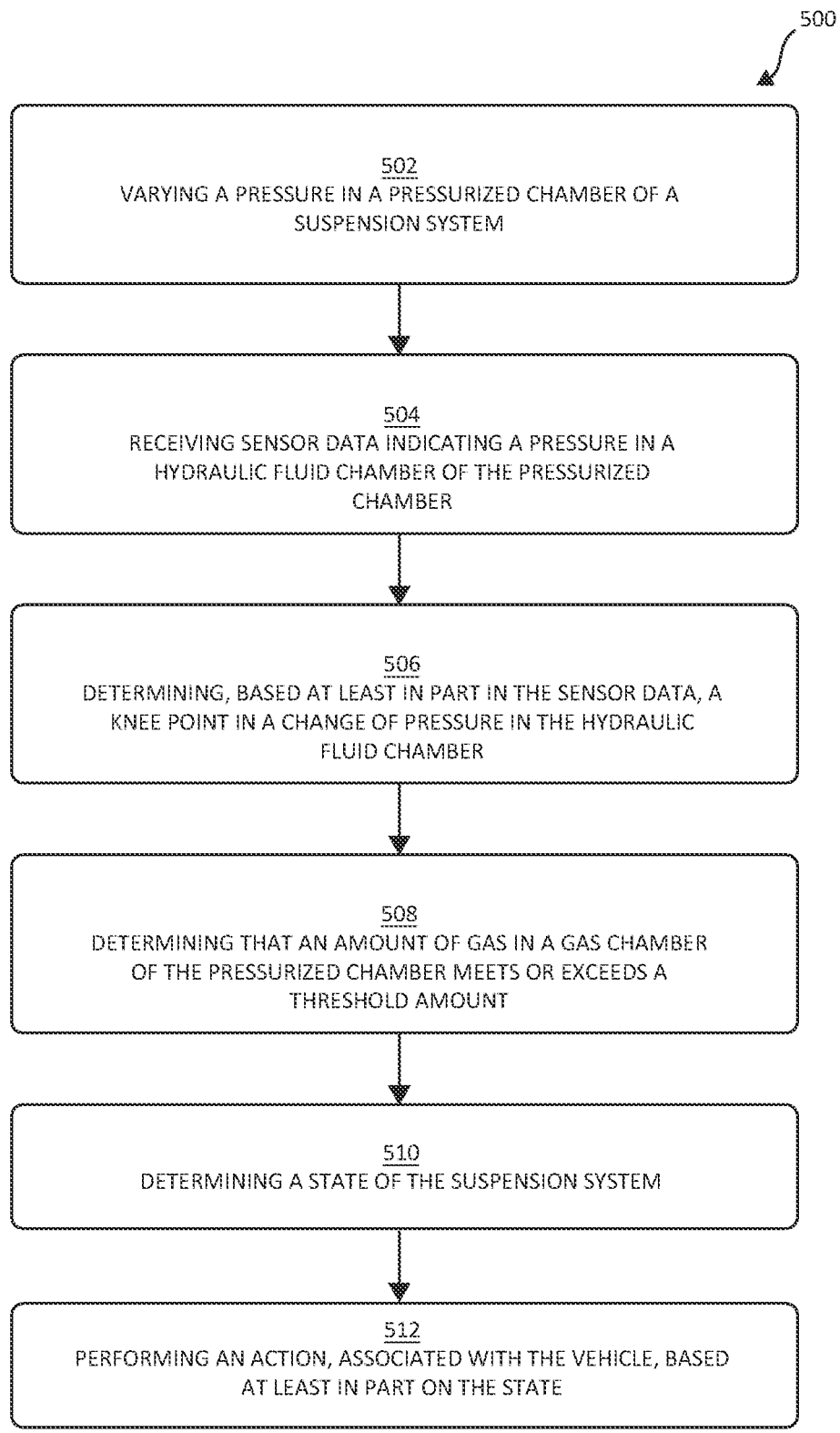
FIG. 5 depicts a flow chart of a process of determining a state of the suspension system and using the state when controlling the vehicle.

FIG. 5 depicts a flow chart of a process 500 of determining a state of a suspension system of a vehicle and performing an action, associated with the vehicle, based at least in part on the state of the suspension system. The suspension system may be similarly configured as the system 10 discussed above in connection with FIG. 1. The process 500 comprises varying 502 a pressure in a pressurized chamber of a suspension system of a vehicle. The pressurized chamber is divided into a hydraulic fluid chamber and a gas chamber. The hydraulic chamber may, for example, be a hydraulic fluid chamber of a spring or an accumulator of the suspension system. The hydraulic fluid chamber may be separated from the gas chamber by means of a separator, which is movable to allow the volume of the gas chamber increase as the pressure in the hydraulic fluid chamber is reduced. The process 500 further comprises receiving 504, over a period of time, sensor data indicating pressure in the hydraulic fluid chamber and determining 506, based at least in part on the sensor data, a knee point in a change of pressure in the hydraulic fluid chamber during the period of time. The knee point may be indicative of a change between a predominantly compressible operating regime and a predominantly incompressible operating regime of the pressurized chamber formed by the hydraulic fluid chamber and the gas chamber. The pressure in the knee point may together with a volume of the gas chamber be used in determining 508 that an amount of gas in the gas chamber meets or exceeds a threshold amount. Determining the knee point may in some examples comprise identifying a pressure at which the rate of change of the pressure meets or exceeds a threshold rate. The rate of change may, for instance, be indicated by a first time derivative or a second time derivative of a mathematical function fitted to the sensor data and the knee point determined as the pressure corresponding to the first derivative meeting or exceeding a predetermined value, or the pressure corresponding to a maximum of the second derivative.

The process 500 may further comprise determining 510, based at least in part on the amount of gas meeting or exceeding the threshold amount, a state of the suspension system and performing 512 an action, associated with the vehicle, based at least in part on the state of the suspension system.

The exemplary process 500 described above may be performed regularly, such as once a day or once a week, or upon request by, for example, a service technician. In some examples, the process 500 is performed as a start-up routine before the vehicle is taken into operation. The process 500 may be performed when the vehicle is positioned on a relatively planar surface, and, in some examples, when the vehicle is unloaded.

The performed action, associated with the vehicle, may, for example, include generating a signal indicating that there is a malfunction of the suspension system, or that there is a need for service of the suspension system because additionally gas is needed to be introduced in the system, for example. In further examples, the process 500 may include determining a future point in time when the suspension system may be in a degraded or malfunctioning state. The determining of the future point in time may, for example, include determining a current amount of gas present in the gas chamber and extrapolating a future amount of gas. The action, associated with the vehicle. may then comprise generating a signal indicating the future point in time in which the extrapolated amount of gas is below the threshold amount and there is a need for service of the suspension system. In further examples, in which a spring of the suspension system is determined to be malfunctioning, the action may include operating one or more of the other springs of the suspension system to compensate for the malfunction. The other spring(s) may, for example, be operated at an increased pressure to reduce the load on the malfunctioning spring. Further examples include driving the vehicle to a test area or service area. A detected malfunction may hence cause the vehicle to be taken out of service and the process 500 repeated to verify the initial result.

Figure 6:
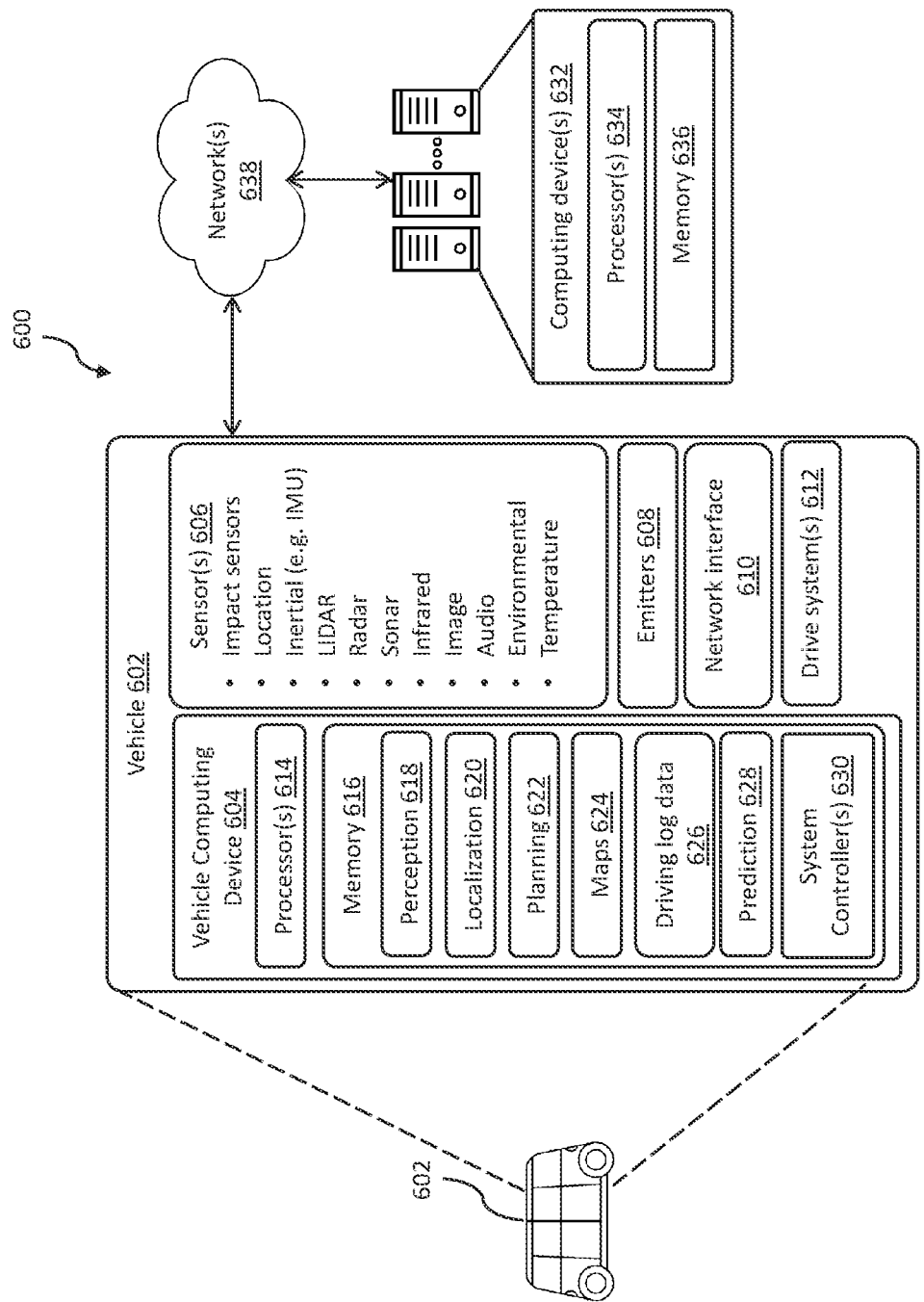
FIG. 6 depicts a block diagram of an example vehicle system.

FIG. 6 illustrates a block diagram of an example system 600 that implements the techniques discussed herein. FIG. 6 may represent the suspension system 10 of FIG. 1, including the suspension control system 161. In some instances, the example system 600 may include a vehicle 602, which may represent the vehicle 100 in FIG. 1. In some instances, the vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being exposed to control the vehicle at any time. However, in other examples, the vehicle 602 may be a fully or partially autonomous vehicle having any other level or classification. Moreover, in some instances, the techniques described herein may be useable by non-autonomous vehicles as well.

The vehicle 602 may include a vehicle computing device(s) 604, sensor(s) 606 (such as the pressure sensor(s) 171, 172 in FIG. 1), emitter(s) 608, network interface(s) 610, and/or drive system(s) 612. The system 600 may additionally or alternatively comprise computing device(s) 632.

In some instances, the sensor(s) 606 may include LIDAR sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 606 may include multiple instances of each of these or other types of sensors. For instance, the radar sensors may include individual radar sensors located at the corners, front, back, sides, and/or top of the vehicle 602. As another example, the cameras may include multiple cameras disposed at various locations about the exterior and/or interior of the vehicle 602. The sensor(s) 606 may provide input to the vehicle computing device(s) 604 and/or to computing device(s) 632.

The vehicle 602 may also include emitter(s) 608 for emitting light and/or sound, as described above. The emitter(s) 608 may include interior audio and visual emitter(s) to communicate with passengers of the vehicle 602. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 608 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 602 may also include network interface(s) 610 that enable communication between the vehicle 602 and one or more other local or remote computing device(s). The network interface(s) 610 may facilitate communication with other local computing device(s) on the vehicle 602 and/or the drive component(s) 612. The network interface(s) 610 may additionally or alternatively allow the vehicle to communicate with other nearby computing device(s) (e.g., other nearby vehicles, traffic signals, etc.). The network interface(s) 610 may additionally or alternatively enable the vehicle 602 to communicate with computing device(s) 632 over a network 638. In some examples, computing device(s) 632 may comprise one or more nodes of a distributed computing system (e.g., a cloud computing architecture).

The vehicle 602 may include one or more drive components 612. In some instances, the vehicle 602 may have a single drive component 612. In some instances, the drive component(s) 612 may include one or more sensors to detect conditions of the drive component(s) 612 and/or the surroundings of the vehicle 602. By way of example and not limitation, the sensor(s) of the drive component(s) 612 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 612. In some cases, the sensor(s) on the drive component(s) 612 may overlap or supplement corresponding systems of the vehicle 602 (e.g., sensor(s) 606).

The drive component(s) 612 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, such as the springs 110-140 and the accumulator 150 in FIG. 1, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 912 may include a drive component controller which may receive and pre-process data from the sensor(s) and to control operation of the various vehicle systems, such as the suspension system 10. In some instances, the drive component controller may include one or more processors and memory communicatively coupled with the one or more processors. The memory may store one or more components to perform various functionalities of the drive component(s) 612. Furthermore, the drive component(s) 612 may also include one or more communication connection(s) that enable communication by the respective drive component with one or more other local or remote computing device(s).

The vehicle computing device(s) 604 may include processor(s) 614 and memory 616 communicatively coupled with the one or more processors 614. Computing device(s) 632 may also include processor(s) 634, and/or memory 636. The processor(s) 614 and/or 634 may be any suitable processor capable of executing instructions to process data and perform operations as described herein. By way of example and not limitation, the processor(s) 614 and/or 634 may comprise one or more central processing units (CPUs), graphics processing units (GPUS), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 616 and/or 636 may be examples of non-transitory computer-readable media. The memory 616 and/or 636 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), non-volatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 616 and/or memory 636 may store a perception component 618, localization component 620, planning component 622, map(s) 624, driving log data 626, prediction component 628, and/or system controller(s) 630—zero or more portions of any of which may be hardware, such as GPU(s), CPU(s), and/or other processing units.

The perception component 618 may detect object(s) in in an environment surrounding the vehicle 602 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 618 is referred to as perception data. The perception component 618 may be configured to associate a bounding region (or other indication) with an identified object. The perception component 618 may be configured to associate a confidence score associated with a classification of the identified object with an identified object. In some examples, objects, when rendered via a display, can be colored based on their perceived class. The object classifications determined by the perception component 618 may distinguish between different object types such as, for example, a passenger vehicle, a pedestrian, a bicyclist, motorist, a delivery truck, a semi-truck, traffic signage, and/or the like.

In at least one example, the localization component 620 may include hardware and/or software to receive data from the sensor(s) 606 to determine a position, velocity, and/or orientation of the vehicle 602 (e.g., one or more of an x-, y-, z-position, roll, pitch, or yaw). For example, the localization component 620 may include and/or request/receive map(s) 624 of an environment and can continuously determine a location, velocity, and/or orientation of the autonomous vehicle 602 within the map(s) 624. In some instances, the localization component 620 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 620 may provide data to various components of the vehicle 602 to determine an initial position of an autonomous vehicle for generating a trajectory and/or for generating map data, as discussed herein. In some examples, localization component 620 may provide, to the perception component 618, a location and/or orientation of the vehicle 602 relative to the environment and/or sensor data associated therewith.

The planning component 622 may receive a location and/or orientation of the vehicle 602 from the localization component 620 and/or perception data from the perception component 618 and may determine instructions for controlling operation of the vehicle 602 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 630 and/or drive component(s) 612 may parse/cause to be carried out, second instructions for the emitter(s) 608 may be formatted according to a second format associated therewith).

The driving log data 626 may comprise sensor data, perception data, and/or scenario labels collected/determined by the vehicle 602 (e.g., by the perception component 618), as well as any other message generated and or sent by the vehicle 602 during operation including, but not limited to, control messages, error messages, etc. In some examples, the vehicle 602 may transmit the driving log data 626 to the computing device(s) 632.

The prediction component 628 may generate one or more probability maps representing prediction probabilities of possible locations of one or more objects in an environment. For example, the prediction component 628 may generate one or more probability maps for vehicles, pedestrians, animals, and the like within a threshold distance from the vehicle 602. In some examples, the prediction component 628 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 622 may be communicatively coupled to the prediction component 628 to generate predicted trajectories of objects in an environment. For example, the prediction component 628 may generate one or more predicted trajectories for objects within a threshold distance from the vehicle 602. In some examples, the prediction component 628 may measure a trace of an object and generate a trajectory for the object based on observed and predicted behavior. Although prediction component 628 is shown on a vehicle 602 in this example, the prediction component 628 may also be provided elsewhere, such as in a remote computing device. In some examples, a prediction component may be provided at both a vehicle and a remote computing device. These components may be configured to operate according to the same or a similar algorithm.

The memory 616 and/or 636 may additionally or alternatively store a mapping system, a planning system, a ride management system, etc. Although perception component 618 and/or planning component 622 are illustrated as being stored in memory 616, perception component 618 and/or planning component 622 may include processor-executable instructions, machine-learned model(s) (e.g., a neural network), and/or hardware.

As described herein, the localization component 620, the perception component 618, the planning component 622, and/or other components of the system 600 may comprise one or more ML models. For example, the localization component 620, the perception component 618, and/or the planning component 622 may each comprise different ML model pipelines. In some examples, an ML model may comprise a neural network. An exemplary neural network is a biologically inspired algorithm which passes input data through a series of connected layers to produce an output.

Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 620 may additionally or alternatively store one or more system controller(s) 630, which may be configured to control steering, propulsion, braking, safety, emitters, communication, and other systems of the vehicle 602. These system controller(s) 630 may communicate with and/or control corresponding systems of the drive component(s) 612 and/or other components of the vehicle 602.

It should be noted that while FIG. 6 is illustrated as a distributed system, in alternative examples, components of the vehicle 602 may be associated with the computing device(s) 632 and/or components of the computing device(s) 632 may be associated with the vehicle 602. That is, the vehicle 602 may perform one or more of the functions associated with the computing device(s) 632, and vice versa.

Example Clauses

A. A system comprising a plurality of springs, wherein each spring couples a chassis of a vehicle to a respective wheel of the vehicle, and wherein each spring comprises a hydraulic fluid chamber and a gas chamber separated by a movable separator, wherein the plurality of springs includes: a first spring including a first hydraulic fluid chamber and a first gas chamber, and a second spring including a second hydraulic fluid chamber; the system further comprising: one or more processors; and one or more non-transitory computer-readable media storing instructions executable by the one or more processors, wherein the instructions, when executed, cause the system to perform operations comprising: gradually reducing the pressure in the first hydraulic fluid chamber while maintaining the pressure in the second hydraulic fluid chamber, receiving, over a period of time, sensor data indicating pressure in the first hydraulic fluid chamber, determining, based at least in part on the sensor data, a knee point in a change of pressure in the first hydraulic fluid chamber during the period of time, the knee point being indicative of a change from a predominantly compressible operating regime to a predominantly incompressible operating regime of the spring, determining, based at least in part on a pressure in the knee point and a predetermined volume of the first gas chamber, an amount of gas present in the first gas chamber, comparing the amount of gas with a predetermined value, determining, based at least in part on the comparison, a state of the first spring, and controlling the vehicle based at least in part on the state of the first spring.

B. The system of clause A, wherein: the plurality of springs further comprises a third spring including a third hydraulic fluid chamber; the second spring and the third spring are arranged diagonally across the vehicle; and the instructions further cause the system to perform actions comprising increasing the pressure in the second hydraulic fluid chamber and the third hydraulic fluid chamber to reduce a load exerted by the chassis on the first spring.

C. The system of any of clause A-B, wherein the determining the amount of gas present in the first gas chamber comprises calculating an amount of substance of the gas based at least in part on the ideal gas law.

D. The system of clause C, wherein the instructions further cause the system to perform actions comprising receiving, during the period of time, sensor data indicating a temperature in the first gas chamber, and wherein the calculating the amount of substance of the gas is further based at least in part on the sensor data indicating the temperature.

E. The system of any of clause A-D, wherein determining the knee point comprises identifying a pressure at which the rate of change of the pressure meets or exceeds a threshold rate.

F. A method comprising: receiving, over a period of time, sensor data indicating a pressure in a pressurized chamber of a suspension system of a vehicle, the pressurized chamber comprising a hydraulic fluid chamber and a gas chamber separated by a movable separator; varying the pressure in the hydraulic fluid chamber; determining, based at least in part on the sensor data, a knee point in a change of pressure in the hydraulic fluid chamber during the period of time, the knee point being indicative of a change between a predominantly compressible operating regime and a predominantly incompressible operating regime of the pressurized chamber; determining, based at least in part on a pressure in the knee point, a state of the suspension system; and performing, based at least in part on the state of the suspension system, an action associated with the vehicle.

G. The method of clause F, further comprising comparing the pressure in the knee point with a reference pressure, wherein the determining the state of the suspension system is based at least in part on the comparison of the pressure in the knee point with the reference pressure.

H. The method of any of clause F-G, further comprising: calculating a pressure of the gas present in the gas chamber based at least in part on a predetermined amount of gas in the gas chamber and a predetermined volume of the gas chamber; and comparing the calculated pressure of the gas with the pressure in the knee point; wherein the determining the state of the suspension system is based at least in part on the comparison of the calculated pressure of the gas with the pressure in the knee point.

I. The method of any of clause F-H, further comprising: determining a rate of change of the pressure in at least one of the predominantly compressible operating regime and the predominantly incompressible operating regime; and comparing the rate of change with a predetermined rate; wherein the determining the state of the suspension system is based at least in part on the comparison of the rate of change with the predetermined rate.

J. The method of any of clause F-I, further comprising determining, based at least in part on the pressure in the knee point and a predetermined volume of the gas chamber, that an amount of gas present in the gas chamber meets or exceeds a threshold amount, wherein the determining the state of the suspension system is based at least in part on the amount of gas meeting or exceeding the threshold amount.

K. The method of clause J, wherein the predetermined volume of the gas chamber corresponds to the pressurized chamber being in a state in which the gas chamber has reached a maximum volume and the hydraulic fluid chamber has reached a minimum volume.

L. The method of any of clause F-K, wherein the varying the pressure in the hydraulic fluid chamber comprises monotonically reducing or monotonically increasing the pressure over the period of time.

M. The method of any of clause F-L, wherein the determining the knee point comprises identifying a pressure at which the rate of change of the pressure meets or exceeds a threshold rate.

N. The method of any of clause F-M, wherein the determining the knee point comprises: determining a second time derivative of the pressure indicated by the sensor data; identifying a maximum of the second time derivative; and determining, based at least in part on the maximum of the second time derivative, that the rate of change of the pressure meets or exceeds a threshold rate.

O. The method of any of clause F-N, wherein the performing the action associated with the vehicle comprises: predicting, based at least in part on the state of the suspension system, a future point in time in which the amount of gas is below the threshold amount.

P. One or more non-transitory computer-readable media storing instructions executable by one or more processors, wherein the instructions, when executed, cause the one or more processors to perform operations comprising: receiving, over a period of time, sensor data indicating a pressure in a pressurized chamber of a suspension system of a vehicle, the pressurized chamber comprising a hydraulic fluid chamber and a gas chamber separated by a movable separator; varying the pressure in the hydraulic fluid chamber; determining, based at least in part on the sensor data, a knee point in a change of pressure int ch hydraulic fluid chamber during the period of time, the knee point being indicative of a change between a predominantly compressible operating regime and a predominantly incompressible operating regime of the pressurized chamber; determining, based at least in part on a pressure in the knee point, a state of the suspension system; and performing, based at least in part on the state of the suspension system, an action associated with the vehicle.

Q. The one or more non-transitory computer-readable media of clause P, wherein the operations further comprise comparing the pressure in the knee-point with a reference pressure, and wherein the determining the state of the suspension system is based at least in part on the comparison of the pressure in the knee point with the reference pressure.

R. The one of more non-transitory computer-readable media of any of clause P-Q, wherein the operations further comprise: calculating a pressure of the gas present in the gas chamber based at least in part on a predetermined amount of gas in the gas chamber and a predetermined volume of the gas chamber; and comparing the calculated pressure of the gas with the pressure in the knee point; wherein the determining the state of the suspension system is based at least in part on the comparison of the calculated pressure of the gas with the pressure in the knee point.

S. The one of more non-transitory computer-readable media of any of clause P-R, wherein the operations further comprise determining, based at least in part on the pressure in the knee point and a predetermined volume of the gas chamber, that an amount of gas present in the gas chamber meets or exceeds a threshold amount, wherein the determining the state of the suspension system is based at least in part on the amount of gas meeting or exceeding the threshold amount.

T. The one or more non-transitory computer-readable media of any of clause P-S, wherein the determining the knee point comprises identifying a pressure at which the rate of change of the pressure meets or exceeds a threshold rate.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
a plurality of springs, wherein each spring couples a chassis of a vehicle to a respective wheel of the vehicle, and wherein each spring comprises a hydraulic fluid chamber and a gas chamber separated by a movable separator, wherein the plurality of springs includes:
a first spring including a first hydraulic fluid chamber and a first gas chamber, and
a second spring including a second hydraulic fluid chamber;
the system further comprising:
one or more processors; and
one or more non-transitory computer-readable media storing instructions executable by the one or more processors, wherein the instructions, when executed, cause the system to perform operations comprising:
gradually reducing the pressure in the first hydraulic fluid chamber while maintaining the pressure in the second hydraulic fluid chamber,
receiving, over a period of time, sensor data indicating pressure in the first hydraulic fluid chamber,
determining, based at least in part on the sensor data, a knee point in a change of pressure in the first hydraulic fluid chamber during the period of time, the knee point being indicative of a change from a predominantly compressible operating regime to a predominantly incompressible operating regime of the spring,
determining, based at least in part on a pressure in the knee point and a predetermined volume of the first gas chamber, an amount of gas present in the first gas chamber,
comparing the amount of gas with a predetermined value,
determining, based at least in part on the comparison, a state of the first spring, and
controlling the vehicle based at least in part on the state of the first spring.

2. The system of claim 1, wherein:
the plurality of springs further comprises a third spring including a third hydraulic fluid chamber;
the second spring and the third spring are arranged diagonally across the vehicle; and
the instructions further cause the system to perform actions comprising increasing the pressure in the second hydraulic fluid chamber and the third hydraulic fluid chamber to reduce a load exerted by the chassis on the first spring.

3. The system of claim 1, wherein the determining the amount of gas present in the first gas chamber comprises calculating an amount of substance of the gas based at least in part on the ideal gas law.

4. The system of claim 3, wherein the instructions further cause the system to perform actions comprising receiving, during the period of time, sensor data indicating a temperature in the first gas chamber, and wherein the calculating the amount of substance of the gas is further based at least in part on the sensor data indicating the temperature.

5. The system of claim 1, wherein determining the knee point comprises identifying a pressure at which the rate of change of the pressure meets or exceeds a threshold rate.

6. A method comprising:
receiving, over a period of time, sensor data indicating a pressure in a pressurized chamber of a suspension system of a vehicle, the pressurized chamber comprising a hydraulic fluid chamber and a gas chamber separated by a movable separator;
varying the pressure in the hydraulic fluid chamber;
determining, based at least in part on the sensor data, a knee point in a change of pressure in the hydraulic fluid chamber during the period of time, the knee point being indicative of a change between a predominantly compressible operating regime and a predominantly incompressible operating regime of the pressurized chamber;
determining, based at least in part on a pressure in the knee point, a state of the suspension system; and
performing, based at least in part on the state of the suspension system, an action associated with the vehicle.

7. The method of claim 6, further comprising comparing the pressure in the knee point with a reference pressure, wherein the determining the state of the suspension system is based at least in part on the comparison of the pressure in the knee point with the reference pressure.

8. The method of claim 6, further comprising:
calculating a pressure of the gas present in the gas chamber based at least in part on a predetermined amount of gas in the gas chamber and a predetermined volume of the gas chamber; and
comparing the calculated pressure of the gas with the pressure in the knee point;
wherein the determining the state of the suspension system is based at least in part on the comparison of the calculated pressure of the gas with the pressure in the knee point.

9. The method of claim 6, further comprising:
determining a rate of change of the pressure in at least one of the predominantly compressible operating regime and the predominantly incompressible operating regime; and
comparing the rate of change with a predetermined rate;
wherein the determining the state of the suspension system is based at least in part on the comparison of the rate of change with the predetermined rate.

10. The method of claim 6, further comprising determining, based at least in part on the pressure in the knee point and a predetermined volume of the gas chamber, that an amount of gas present in the gas chamber meets or exceeds a threshold amount, wherein the determining the state of the suspension system is based at least in part on the amount of gas meeting or exceeding the threshold amount.

11. The method of claim 10, wherein the predetermined volume of the gas chamber corresponds to the pressurized chamber being in a state in which the gas chamber has reached a maximum volume and the hydraulic fluid chamber has reached a minimum volume.

12. The method of claim 6, wherein the varying the pressure in the hydraulic fluid chamber comprises monotonically reducing or monotonically increasing the pressure over the period of time.

13. The method of claim 6, wherein the determining the knee point comprises identifying a pressure at which the rate of change of the pressure meets or exceeds a threshold rate.

14. The method of claim 6, wherein the determining the knee point comprises:
determining a second time derivative of the pressure indicated by the sensor data;
identifying a maximum of the second time derivative; and
determining, based at least in part on the maximum of the second time derivative, that the rate of change of the pressure meets or exceeds a threshold rate.

15. The method of claim 6, wherein the performing the action associated with the vehicle comprises:
predicting, based at least in part on the state of the suspension system, a future point in time in which the amount of gas is below the threshold amount.

16. One or more non-transitory computer-readable media storing instructions executable by one or more processors, wherein the instructions, when executed, cause the one or more processors to perform operations comprising:
receiving, over a period of time, sensor data indicating a pressure in a pressurized chamber of a suspension system of a vehicle, the pressurized chamber comprising a hydraulic fluid chamber and a gas chamber separated by a movable separator;
varying the pressure in the hydraulic fluid chamber;
determining, based at least in part on the sensor data, a knee point in a change of pressure in the hydraulic fluid chamber during the period of time, the knee point being indicative of a change between a predominantly compressible operating regime and a predominantly incompressible operating regime of the pressurized chamber;
determining, based at least in part on a pressure in the knee point, a state of the suspension system; and
performing, based at least in part on the state of the suspension system, an action associated with the vehicle.

17. The one or more non-transitory computer-readable media of claim 16, wherein the operations further comprise comparing the pressure in the knee-point with a reference pressure, and wherein the determining the state of the suspension system is based at least in part on the comparison of the pressure in the knee point with the reference pressure.

18. The one of more non-transitory computer-readable media of claim 16, wherein the operations further comprise:
calculating a pressure of the gas present in the gas chamber based at least in part on a predetermined amount of gas in the gas chamber and a predetermined volume of the gas chamber; and
comparing the calculated pressure of the gas with the pressure in the knee point;
wherein the determining the state of the suspension system is based at least in part on the comparison of the calculated pressure of the gas with the pressure in the knee point.

19. The one of more non-transitory computer-readable media of claim 16, wherein the operations further comprise determining, based at least in part on the pressure in the knee point and a predetermined volume of the gas chamber, that an amount of gas present in the gas chamber meets or exceeds a threshold amount, wherein the determining the state of the suspension system is based at least in part on the amount of gas meeting or exceeding the threshold amount.

20. The one or more non-transitory computer-readable media of claim 16, wherein the determining the knee point comprises identifying a pressure at which the rate of change of the pressure meets or exceeds a threshold rate.

* * * * *